United States Patent
Yun (10) Patent No.: US 8,229,928 B2
(45) Date of Patent: Jul. 24, 2012

(54) 3D OBJECT DESCRIPTORS

(75) Inventor: Il Dong Yun, Gyeonggi-do (KR)

(73) Assignee: Empire Technology Development LLC, Wilmington, DE (US)

( * ) Notice: Subject to any disclaimer, the term of this patent is extended or adjusted under 35 U.S.C. 154(b) by 593 days.

(21) Appl. No.: 12/395,441

(22) Filed: Feb. 27, 2009

(65) Prior Publication Data
US 2010/0223299 A1 Sep. 2, 2010

(51) Int. Cl.
G06F 7/00 (2006.01)
G06F 17/30 (2006.01)
G06K 9/00 (2006.01)

(52) U.S. Cl. ........................................ 707/737; 382/154

(58) Field of Classification Search .................. 707/737; 382/154
See application file for complete search history.

(56) References Cited

U.S. PATENT DOCUMENTS

| 7,171,060 | B2 | 1/2007 | Park et al. | |
| 2005/0286767 | A1* | 12/2005 | Hager et al. | 382/190 |
| 2007/0183669 | A1* | 8/2007 | Owechko et al. | 382/224 |
| 2007/0203872 | A1* | 8/2007 | Flinn et al. | 706/62 |
| 2009/0096790 | A1* | 4/2009 | Wiedemann et al. | 345/427 |

OTHER PUBLICATIONS

Lee et al., "Selecting Representative Views of 3D Objects by Affinity Propagation for Retrieval and Classification," Journal of the Korean Society of Broadcast Engineers (Nov. 28, 2008), pp. 828-837, vol. 13, No. 6 (with partial English translation).
Lee et al., "A New 3-D Model Retrieval System Based on Aspect-Transition Descriptor," Computer Vision—ECCV 2006: 9th European Conference on Computer Vision, Graz, Austria, May 7-13, 2006, Proceedings, Part IV, (Aleš Leonardis, Horst Bischof, and Axel Pinz eds.), 2006, pp. 543-554, LNCS vol. 3954, Springer-Verlag, Berlin/Heidelberg.
Frey, B. J. and Dueck, D., "Clustering by Passing Messages Between Data Points," Science, Feb. 16, 2007, vol. 315, No. 5814, pp. 972-976.
Martinez, J. M., "MPEG-7: Overview of MPEG-7 Description Tools, Part 2," IEEE Multimedia, vol. 9, No. 3, pp. 83-93, Jul.-Sep. 2002.
"Princeton Shape Benchmark" Princeton Shape Retrieval and Analysis Group, last updated Mar. 5, 2005, accessed at http://shape.cs.princeton.edu/benchmark/, pp. 3.
Zelnik-Manor, L. and Perona, P. "Self-Tuning Spectral Clustering," Advances in Neural Information Processing Systems, 2004, vol. 2, pp. 1601-1608.

* cited by examiner

*Primary Examiner* — Fred I Ehichioya
*Assistant Examiner* — Kris Mackes
(74) *Attorney, Agent, or Firm* — Knobbe, Martens, Olson & Bear LLP (57) ABSTRACT

Techniques for matching a 3D object are provided. In some embodiments, a 3D object retrieval apparatus includes an input unit configured to receive as input at least one sample view of a 3D query object to be inputted, and an object descriptor determining unit configured to generate at least one object representative image of the 3D query object from the at least one sample view and to determine a query object descriptor of the 3D query object from the at least one object representative image.

16 Claims, 8 Drawing Sheets

3D OBJECT DESCRIPTORS

BACKGROUND

The recent, widespread use of digital cameras has led to the common use of image editing software, and other related technologies and devices, to manage and manipulate digital images of 3D objects. One useful aspect of digital image devices and applications is to provide a user the ability to manage, retrieve, manipulate, and use images of 3D objects efficiently and effectively.

Use of 3D object images has been recognized as being useful in various applications such as multimedia, computer-aided design (CAD), robot vision, and medical imaging. For example, conventional 3D multimedia-based service applications may allow users to capture images of the 3D object and transmit the captured images to a remote server to search for information relating to the 3D object that is stored in a database on the server. These 3D applications require that the 3D object be described sufficiently for identifying the 3D object, in order to make possible the retrieval of information related to the 3D object.

In line with the increasing demands for 3D applications, extensive research on the construction of 3D objects has been conducted, resulting in accessibility to various modeling tools and greater number of collections of 3D objects. However, resulting inefficiencies arise as these conventional 3D object retrieval systems perform exhaustive searches of 3D objects in a database especially as the database grows extensively large.

SUMMARY

Various embodiments of 3D image descriptors are provided. In one embodiment, by way of non-limiting example, an apparatus includes an input unit configured to enable at least one sample view of a 3D query object to be inputted, and an object descriptor determining unit configured to generate at least one object representative image of the 3D query object from the at least one sample view and to determine a query object descriptor of the 3D query object from the at least one object representative image.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and made part of this disclosure.

It is to be understood that apparatuses and methods according to the illustrative embodiments of the present disclosure may be implemented in various forms including hardware, software, firmware, special purpose processors, or a combination thereof. For example, one or more example embodiments of the present disclosure may be implemented as an application having program or other suitable computer-executable instructions that are tangibly embodied on at least one computer-readable media such as a program storage device (e.g., hard disk, magnetic floppy disk, RAM, ROM, CD-ROM, and the like), and executable by any device or machine, including computers and computer systems, having a suitable configuration. Generally, computer-executable instructions, which may be in the form of program modules, include routines, programs, objects, components, data structures, etc. that perform particular tasks or implement particular abstract data types. The functionality of the program modules may be combined or distributed as desired in various embodiments. It is to be further understood that, because some of the constituent system components and process operations depicted in the accompanying figures can be implemented in software, the connections between system units/modules (or the logic flow of method operations) may differ depending upon the manner in which the various embodiments of the present disclosure are programmed.

Figure 1:
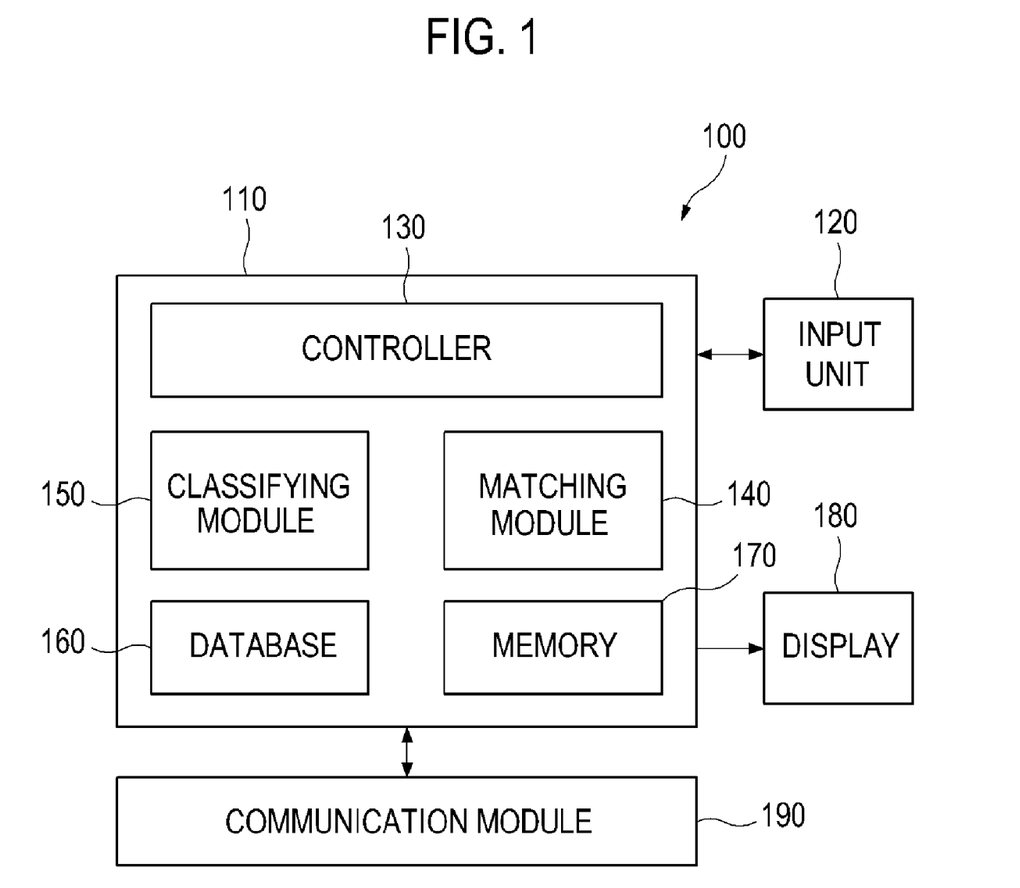
FIG. 1 shows a schematic block diagram of an illustrative embodiment of a 3D object retrieval system.

FIG. 1 shows a schematic block diagram of an illustrative embodiment of a 3D object retrieval apparatus 100. In one embodiment, 3D object retrieval apparatus 100 may include an input unit 120 and a display 180. Input unit 120 may provide an interface for use to control or manipulate the operations of 3D object retrieval apparatus 100. For example, input unit 120 may allow a user to enter at least one sample view of a 3D object (e.g., a 3D query object) onto 3D object retrieval apparatus 100. Here, a sample view may represent the projected shape of a 3D object from a particular viewpoint. In some embodiments, input unit 120 may be operable to enable an image capturing device (not shown) such as a camera, a scanner and the like, to acquire a set of sample views of a 3D object, and to input the so-acquired sample views of the 3D object onto 3D object retrieval apparatus 100. Input unit 120 may include a keypad, a keyboard, a mouse, a touch pad, a touch screen, a pointing device, a trackball, a light pen, a joystick, a speech recognition device, a stylus device, an eye and head movement tracker, a digitizing tablet, a barcode reader, and the like.

In some embodiments, display 180 may provide a visual output, e.g., for viewing by a user, and may include, but is not limited to, flat panel displays, including CRT displays, as well as other suitable output devices. In addition to display 180, 3D object retrieval apparatus 100 may also include other peripheral output devices (not shown), such as speakers and printers.

As depicted in FIG. 1, 3D object retrieval apparatus 100 may further include a computer platform 110 coupled to input unit 120 and display 180. In some embodiments, computer platform 110 may be implemented as at least one chip that can be installed into 3D object retrieval apparatus 100. Computer platform 110 may include one or more functional units/modules that may include hardware, software, or a combination thereof. Moreover, the hardware and software of the functional units/modules may share other hardware and software of other functional units/modules.

Computer platform 110 may include a controller 130, including processors, microprocessors, digital signal processors (DSPs), microcontrollers, and the like. At least one system memory may be embedded in or coupled to controller 130 to store and operate software applications, including an operating system, at least one application program, and other program modules, executing on controller 130. Controller 130 may provide a platform for running a suitable operating system configured to manage and control the operations of 3D object retrieval apparatus 100, including the input and output of data to and from the related software application programs. The operating system may provide an interface between the software application programs being executed on controller 130 and, for example, the hardware components of 3D object retrieval apparatus 100. Examples of suitable operating systems include Microsoft Windows Vista®, Microsoft Windows®, the Apple Macintosh® Operating System ("MacOS"), UNIX® operating systems, LINUX® operating systems, and the like.

Computer platform 110 may further include a database 160 and a memory 170 (including volatile and nonvolatile). Memory 170 may be used for data processing by various functional units/modules included in the 3D object retrieval apparatus 100. Memory 170 may include any computer-readable media such as a Read Only Memory (ROM), EPROM (Erasable ROM), EEPROM (Electrically EPROM), and the like. In addition, memory 170 may be removably detachable memory to allow replacement if and/or when necessary (e.g., when becoming full). Thus, memory 170 may also include one or more other types of storage devices such as a Smart-Media® card, a CompactFlash® card, a MemoryStick®, a MultiMediaCard®, a DataPlay® disc, and/or a SecureDigital® card.

Database 160 may store one or more multimedia contents files, such as MPEG image files and other data associated with the image files. For example, database 160 may store the sample views of 3D candidate objects together with related information such as candidate object descriptors, which provide identifying information relating to the 3D candidate objects. Computer platform 110 may upload at least one sample view of each of the 3D candidate objects stored on database 160 to memory 170 for execution. Database 160 may store the sample views of the 3D candidate objects by using various data structures known in the art. For example, database 160 may store at least one sample view of a 3D candidate object in the form of an array that may be referenced by a candidate object descriptor of the 3D object. Database 160 may be further organized to store the sample views of the 3D candidate objects by class. Each class may have one or more arrays, each having one or more sample views and being referenced by a corresponding candidate object descriptor. In this way, database 160 may store information relating to the 3D candidate objects so that sample views of 3D candidate objects may be stored in association with corresponding candidate object descriptors by class. Database 160 may be a flash memory cell, but can be any storage device known in the art, such as magnetic media, EEPROM, optical media, tape, soft or hard disk, or the like.

Computer platform 110 may further include a matching unit 140 and a classifying unit 150. In some embodiments, matching unit 140 and classifying unit 150 may be implemented by software, hardware, firmware or any combination thereof. In some embodiments, matching unit 140 may be operable to access database 160 to retrieve information on a 3D candidate object that is most similar to a 3D query object. Classifying unit 150 may be configured to classify the sample views of the 3D candidate objects that are stored in database 160 into at least one class. It should be appreciated that although matching unit 140 is depicted as a separate unit from classifying unit 150 in FIG. 1, in some embodiments, matching unit 140 and classifying unit 150 may be implemented by one of the applications executed on controller 130.

As illustrated in FIG. 1, the 3D object retrieval apparatus 100 may further include a communication module 190 to provide logical connections to at least one remote device as a single module or via a wired or wireless communication protocol. Communication module 190 may be coupled to computer platform 110. In one embodiment, a communication protocol (either wired or wireless) may be implemented by employing a digital interface protocol, such as a serial port, parallel port, PS/2 port, universal serial bus (USB) link, firewire or IEEE 1394 link, or wireless interface connection, such as an infrared interface, BlueTooth®, ZigBee, high-definition multimedia interface (HDMI), high-bandwidth digital content protection (HDCP), wireless fidelity (Wi-Fi), local area network (LAN), wide area network (WAN) or the like. In some embodiments, communication module 190 may include a modem to communicate through mobile communications systems such as Global System for Mobile Communications (GSM), Global Positioning System (GPS), Digital Mobile Multimedia (DMB), Code Division Multiple Access (CDMA), High-Speed Down Link Packet Access (HSDPA), Wi-Bro Wireless Broadband, and the like. It will be appreciated that the connection methods described in the present disclosure are only examples and other means of establishing a communications link between the devices/computers may be used.

In a networked environment, part or all of the components of 3D object retrieval apparatus 100 may be implemented as a distributed system through two or more devices, depending on the desired implementations. For example, matching unit 140, classifying unit 150 and database 160 may be implemented at a server, and other modules may be implemented at a mobile device or terminal. In this example, the mobile terminal may transmit the sample views of the 3D query object to the server having matching unit 140 via communication module 190, so that the server may retrieve a matched object from its database to transmit information on the matched object to the mobile terminal. 3D object retrieval apparatus 100 may operate in a networked environment using logical connections to one or more remote devices, such as a remote computer. The remote computer may be a personal computer, a server, hand-held or laptop devices, a router, a network PC, a peer device, or other common network node, and typically may include some or all of the elements described in the present disclosure relative to 3D object retrieval apparatus 100.

3D object retrieval apparatus 100 of FIG. 1 is only one example of a suitable operating environment and is not intended to suggest any limitation with regard to claimed subject matter. Other well known computing systems, environments, and/or configurations that may be suitable for image processing described in the present disclosure include, but are not limited to, personal computers, portable devices such as cellular phones, server computers, hand-held or laptop devices, multiprocessor systems, micro-processor based systems, programmable consumer electronics, network personal computers, mini-computers, mainframe computers, distributed computing environments that include any of units or devices illustrated in FIG. 1, and the like.

Figure 2:
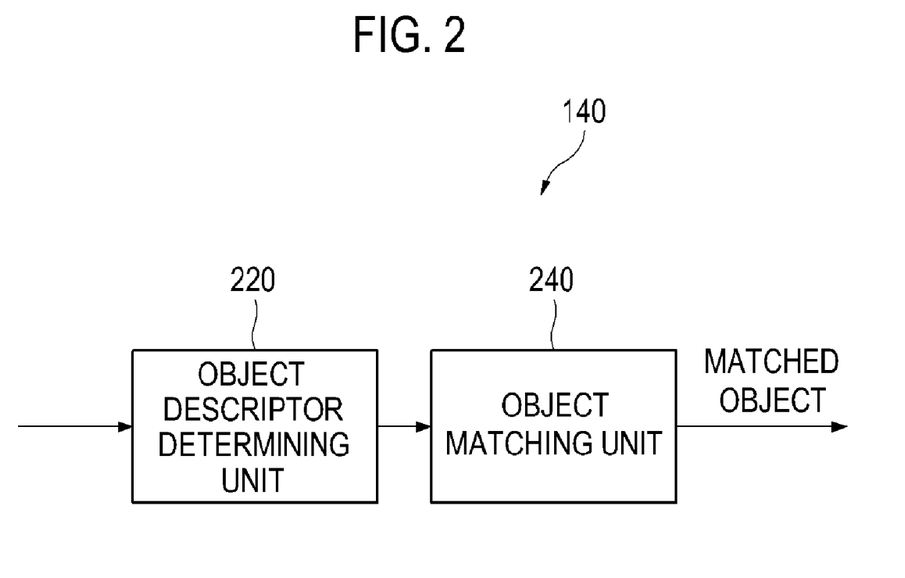
FIG. 2 shows a schematic block diagram of an illustrative embodiment of a matching unit of the 3D object retrieval system.

FIG. 2 shows a schematic block diagram of an illustrative embodiment of matching unit 140 of 3D object retrieval apparatus 100. As shown in FIG. 2, matching unit 140 may include an object descriptor determining unit 220 and an object matching unit 240. In one embodiment, object descriptor determining unit 220 may perform image processing on at least one sample view of a 3D query object that is temporarily stored on memory 170 via input unit 120. The image processing performed by the object descriptor determining unit 220 may include generating at least one object representative image of the 3D query object from its sample views. The object representative images may be generated based on similarities between the sample views. The image processing may further include determining a query object descriptor of the 3D query object based on the generated object representative images. In one embodiment, object descriptor determining unit 220 may store the so determined query object descriptor in association with information relevant to the 3D query object (e.g., object representative images and/or sample views of the 3D query object) in database 160.

Object matching unit 240 may be operable to perform a matching operation by retrieving information (e.g., candidate object descriptors) relating to part or all of the 3D candidate objects from database 160. Object matching unit 240 may compare a query object descriptor of a 3D query object with candidate object descriptors for part or all of the 3D candidate objects to identify similarities therebetween. Object matching unit 240 may output at least one matched object among the 3D candidate objects based on the similarities between the query object descriptor of the 3D query object and the candidate object descriptors of the 3D candidate objects. The similarity may be defined by the distance between any two object descriptors. In some embodiments, object matching unit 240 may perform a two stage search operation to identify at least one matched object. At a first search stage, object matching unit 240 may compare the query object descriptor of the 3D query object with class descriptors that respectively identify candidate classes, each of which may be linked to candidate object descriptors of at least one 3D candidate object. In response to the comparison, object matching unit 240 may produce a matched class that is most likely to include a candidate object descriptor of a 3D candidate object, providing the best match with the 3D query object. At a second search stage, object matching unit 240 may compare the query object descriptor of the 3D query object with the candidate object descriptors of the 3D candidate objects that belong to the matched class to identify at least one matched object similar to the 3D query object. Once the at least one matched object is found, object matching unit 240 may retrieve object representative images of the matched objects for output to or viewing by a user via display 180.

Figure 3:
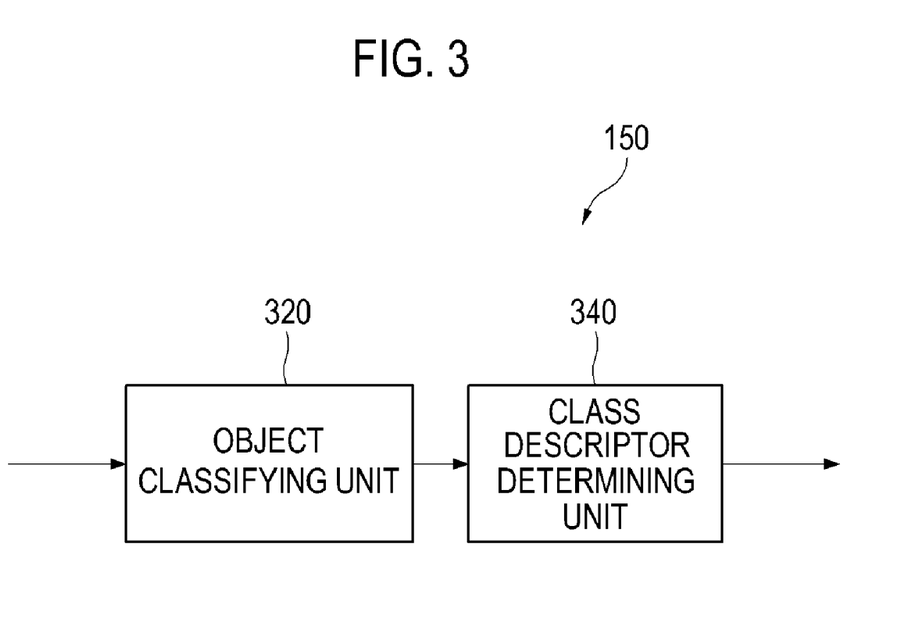
FIG. 3 shows a schematic block diagram of an illustrative embodiment of a classifying unit of the 3D object retrieval system.

FIG. 3 shows a schematic block diagram of an illustrative embodiment of classifying unit 150 of 3D object retrieval apparatus 100. As depicted in FIG. 3, classifying unit 150 may include an object classifying unit 320 and a class descriptor determining unit 340. In one embodiment, object classifying unit 320 may be operable to access database 160 to retrieve information (e.g., candidate object descriptors, object representative images) on part or all of the 3D candidate objects. Object classifying unit 320 may compare the candidate object descriptors of the 3D candidate objects to identify similarities between each pair of the 3D candidate objects. In response to the similarity comparison, object classifying unit 320 may classify each of the candidate object descriptors (3D candidate objects) into a particular class. In this respect, at least one class may be created so that at least one candidate object descriptor is assigned to a particular class.

Class descriptor determining unit 340 may be operable to perform image processing on the object representative images of the 3D candidate objects (object descriptors) that are classified into an arbitrary one of the classes. Such image processing may include applying a clustering algorithm on those object representative images to generate at least one representative image ("class representative images") of the respective class. Class descriptor determining unit 340 may determine a class descriptor of the class based on the generated class representative images in a similar manner that object descriptor determining unit 220 determines a candidate object descriptor from object representative images of the 3D candidate object. Class descriptor determining unit 340 may store the so determined class descriptor in association with information relevant to the respective class (e.g., class representative images and/or candidate object descriptors belonging to that class) in database 160. Class descriptor determining unit 340 may be operable to repeat the above process for the remaining classes to determine class descriptors for all the classes.

Figure 4:
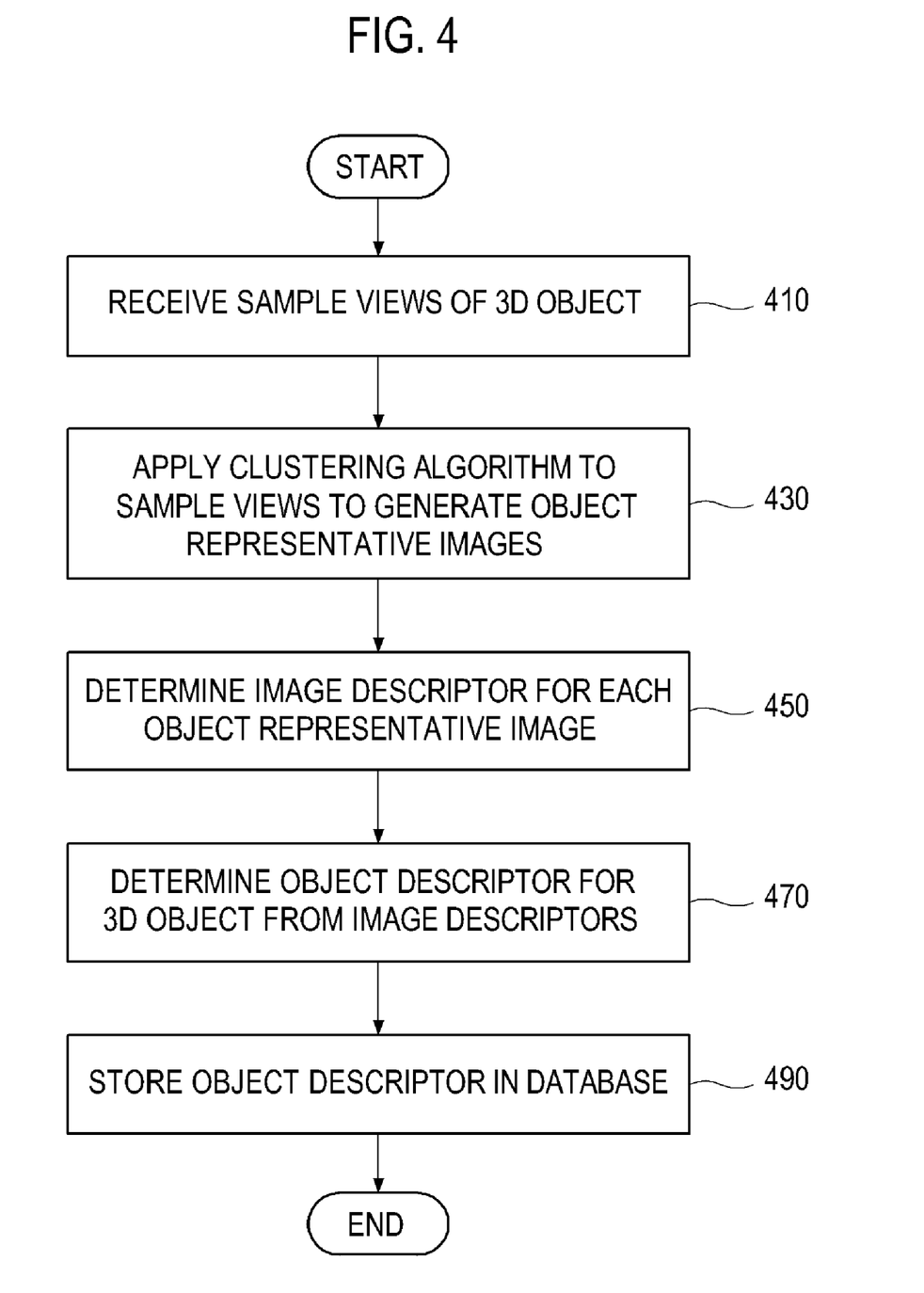
FIG. 4 is a flow chart of an illustrative embodiment of a method for determining a query object descriptor of a 3D query object.
Figure 5:
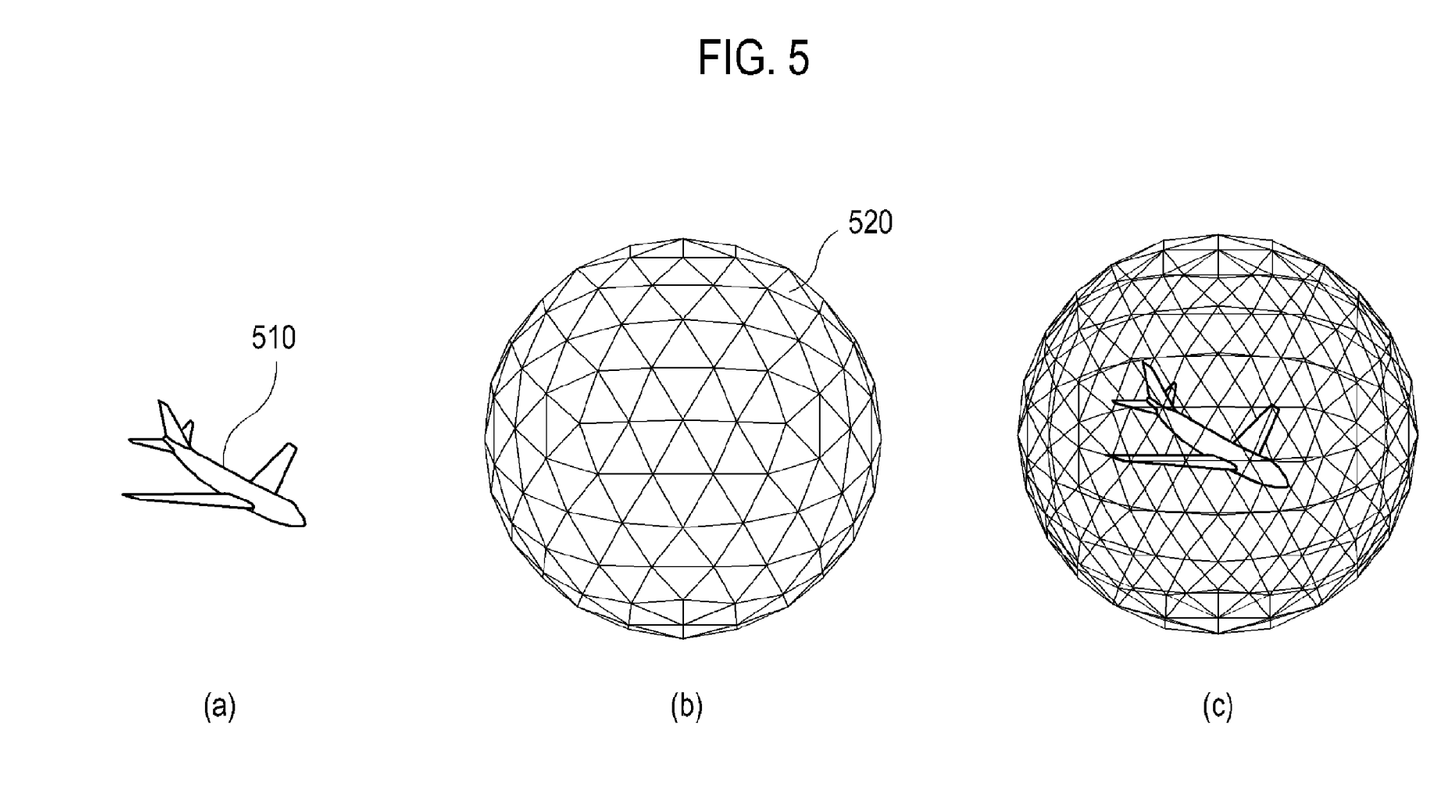
FIG. 5 shows a schematic diagram illustrating an example 3D object and an example virtual geometry for use in capturing the 3D object.

FIG. 4 illustrates a flow chart of an illustrative embodiment of a method for determining a query object descriptor of a 3D query object. In block 410, a set of sample views of a 3D object may be received, for example, through the use of input unit 120. Input unit 120 may enable an image capturing device to capture a set of sample views of the 3D query object (e.g., an airplane 510 as shown in FIG. 5(*a*)) at different view points. The view points may be set through a virtual geometry. By way of non-limiting example, the virtual geometry may include, but is not limited to, a twice subdivided icosahedron having multiple faces 520 (e.g., 320 faces), as shown in FIG. 5(*b*). In this case, the sample views may be captured with the respective view points placed at the center of each face of the twice subdivided icosahedron, as shown in FIG. 5(*c*). With the illustrated twice subdivided icosahedron, it may be possible to make the distribution of the view points dense and uniform. However, it will be readily appreciated that any other virtual geometry may be used to set the view points to be evenly distributed throughout the 3D query object. It will be further appreciated that the view points may be adaptively set so that they are densely distributed over a particular portion of the 3D query object to appropriately capture the silhouette of the 3D query object.

Referring back to FIG. 4, in block 430, object descriptor determining unit 220 may apply a clustering algorithm to the sample views of the 3D query object. The clustering algorithm may include, but is not limited to, an affinity propagation algorithm. In implementing the affinity propagation algorithm, object descriptor determining unit 220 may assign an exemplar to data points (pixel data) at the same spatial position in each pair of sample views of the 3D query object, and measure degree of similarity between the two sample views based on the assigned exemplar. In this respect, object descriptor determining unit 220 may produce object representative images based on similarities for all possible pairs of sample views.

In block 450, object descriptor determining unit 220 may determine an image descriptor ("2D descriptor") for each object representative image of the 3D query object. In determining the image descriptors, object descriptor determining unit 220 may adopt, for example, one of the various image descriptor determination algorithms, which are known in the art. The image descriptor may include an MPEG-7 2D descriptor, such as the Curvature Scale Space (CSS) descriptor and the Angular Radial Transform (ART) descriptor, without limitation.

In block 470, object descriptor determining unit 220 may determine a query object descriptor ("3D descriptor") of the 3D query object from the image descriptors determined in block 450. Determining the query object descriptor may involve performing mathematical operations on the image descriptors, including concatenating the image descriptors, etc. In block 490, object descriptor determining unit 220 may optionally store the query object descriptor together with information relevant to the 3D query object (e.g., object representative images and/or sample views of the 3D query object) in database 160. Object descriptor determining unit 220 then completes.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
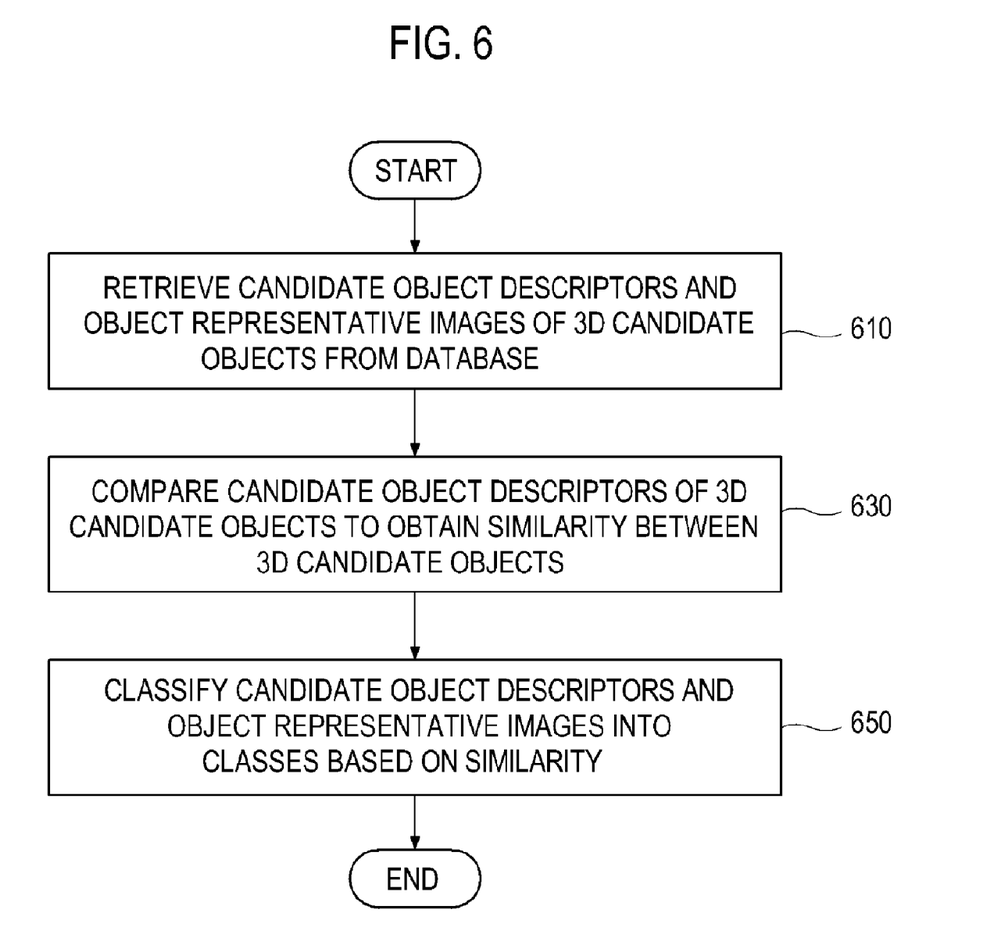
FIG. 6 is a flow chart of an illustrative embodiment of a method for classifying candidate object descriptors into at least one class.

FIG. 6 is a flow chart of an illustrative embodiment of a method for classifying candidate object descriptors into at least one class. In block 610, object classifying unit 320 may access database 160 to retrieve information (e.g., candidate object descriptors, object representative images, etc.) relating to all or part of the 3D candidate objects. In block 630, object classifying unit 320 may compare each pair of candidate object descriptors to identify the similarity therebetween. For example, object classifying unit 320 may calculate a distance, e.g., Euclidian distance, between the two candidate object descriptors as a measure of similarity between the two 3D candidate objects with the two candidate object descriptors respectively assigned thererto. In block 650, based on the comparison, object classifying unit 320 may classify each candidate object descriptor and associated object representative images into a particular class based on similarity. In one embodiment, object classifying unit 320 may classify the candidate object descriptors having a distance less than a predetermined threshold distance into the same class. Object classifying unit 320 then completes. Although the candidate object descriptors have been described as being determined by batch processing in the illustrated embodiment, object classifying unit 320 may classify a query object descriptor of a 3D query object into one of the existing classes upon acquiring the sample views of the 3D query object through the use of input unit 120 for storage into database 160 as a candidate object descriptor as classified.

Figure 7:
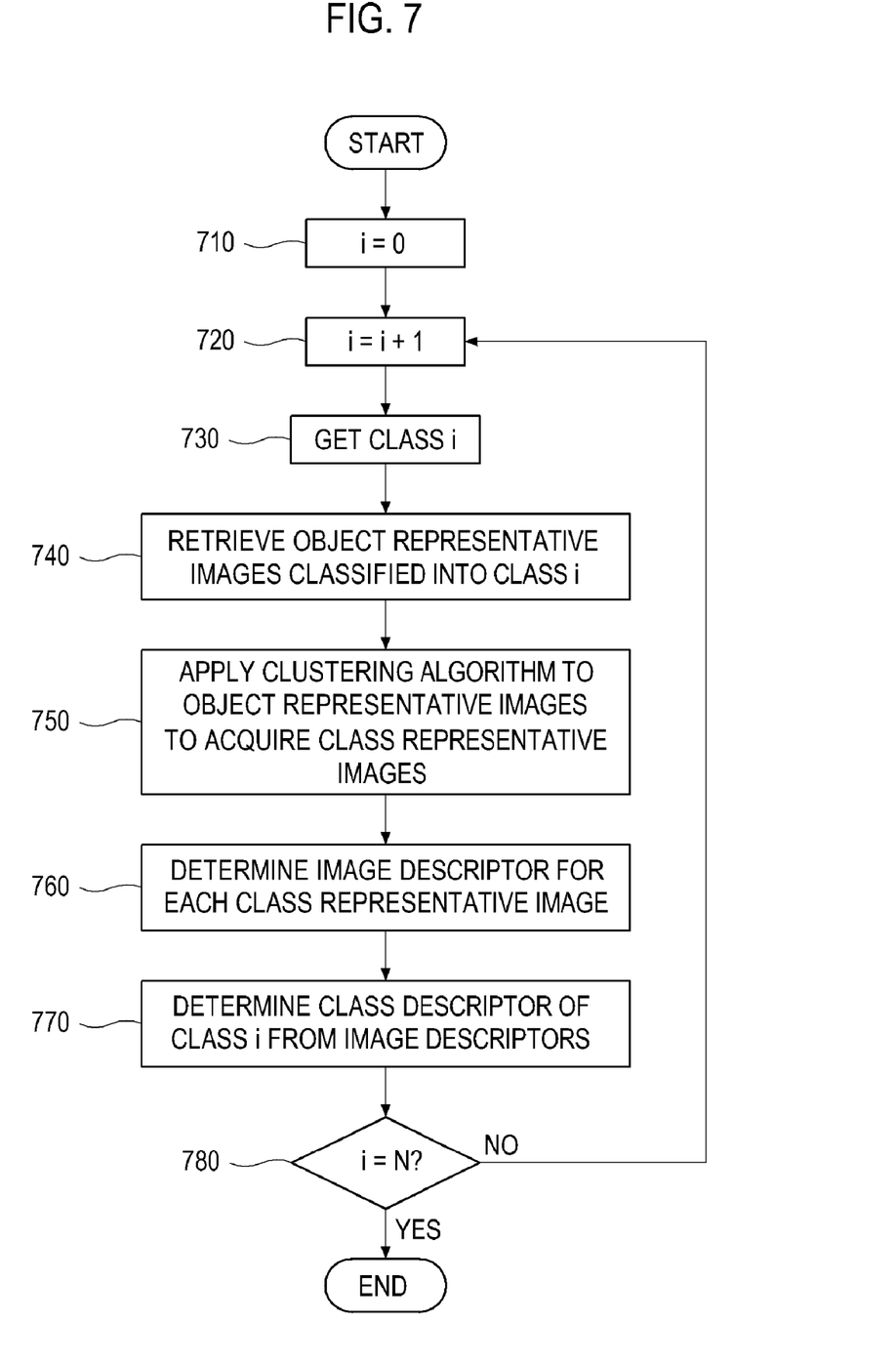
FIG. 7 is a flow chart of an illustrative embodiment of a method for determining class descriptors.

FIG. 7 is a flow chart of an illustrative embodiment of a method for determining class descriptors of at least one class. In block 710, class descriptor determining unit 340 (as shown in FIG. 3) may set a class index i to its initial value (i.e., i=0). In block 720, class descriptor determining unit 340 increases the class index by "1" (i.e., i=i+1). Class descriptor determining unit 340 may execute an instruction such as "Get Class i" (block 730) to retrieve the object representative images that are classified into Class i from database 160 (block 740). Class descriptor determining unit 340 may upload the retrieved object representative images onto memory 170 for performing image processing thereon.

In block 750, class descriptor determining unit 340 may apply a clustering algorithm to the object representative images classified into Class i to produce one or more class representative images of Class i. The clustering algorithm may include, but is not limited to, an affinity propagation algorithm. In block 760, class descriptor determining unit 340 may determine an image descriptor for each class representative image of Class i. The image descriptor may include an MPEG-7 2D descriptor, such as the CSS descriptor and the ART descriptor. In block 770, class descriptor determining unit 340 may determine a class descriptor of Class i from the image descriptors of the class representative images of Class i. In one embodiment, class descriptor determining unit 340 may concatenate the image descriptors of the class representative images to generate a class descriptor of Class i.

In decision block 780, class descriptor determining unit 340 checks to determine whether the class descriptor has been determined for all of the existing classes (e.g. i=N?). If it is determined that the class descriptor has been determined for all of the existing classes, class descriptor determining unit 340 completes. Otherwise, class descriptor determining unit 340 proceeds to block 720 to repeat the operations indicated by blocks 730 to 780. In this respect, class descriptor determining unit 340 may determine class descriptors for all the classes for which the class descriptor is to be determined. Upon completing the process, class descriptor determining unit 340 may store the class descriptor of Class i (i=1 to N) in database 160 in association with information (e.g., class representative images of Class i).

Figure 8:
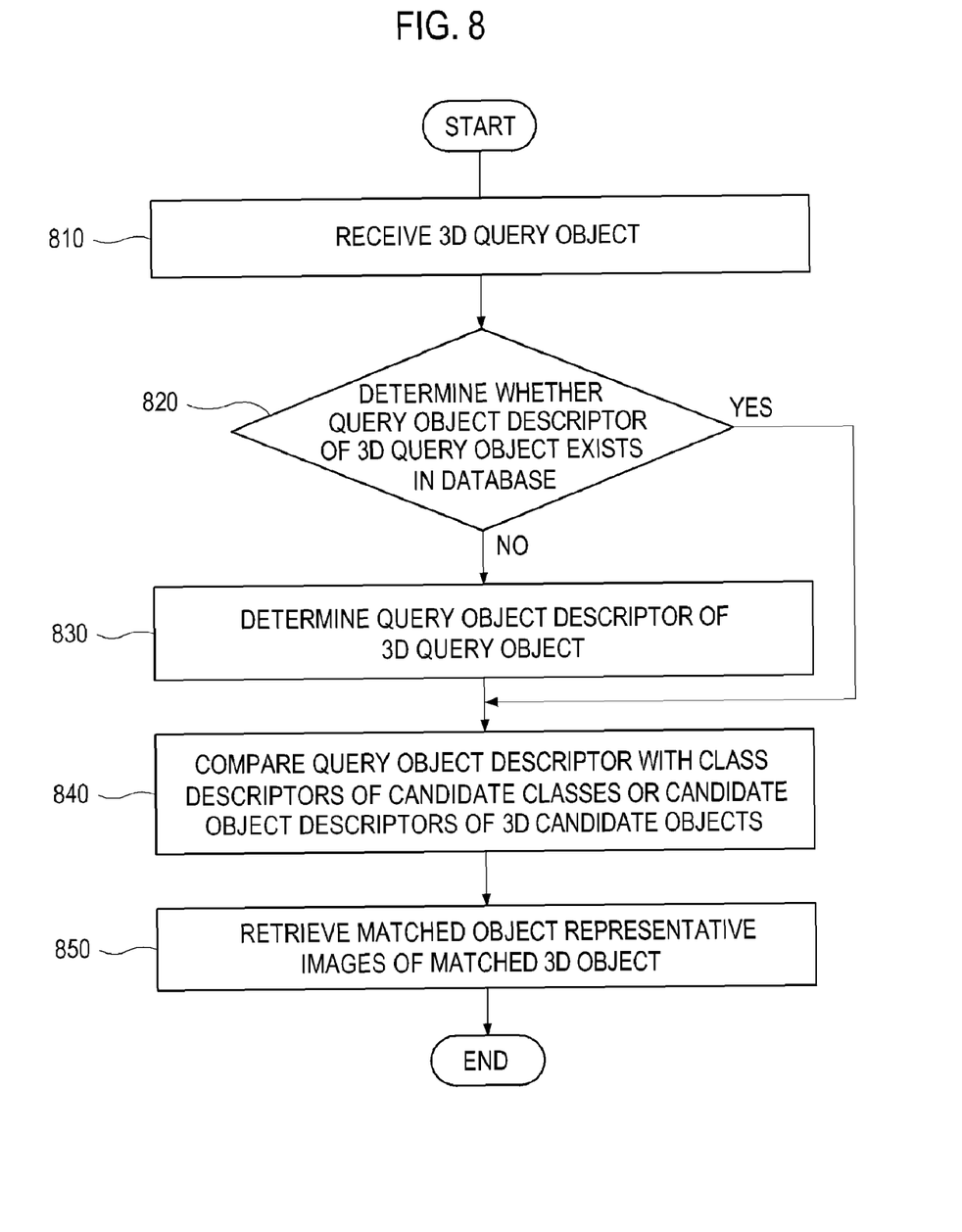
FIG. 8 is a flow chart of an illustrative embodiment of a method for finding a matched object with a 3D query object from 3D candidate objects stored in a database.

FIG. 8 is a flow chart of an illustrative embodiment of a method for finding a matched object with a 3D query object from 3D candidate objects stored in a database. In block 810, input unit 120 may provide an interface to receive a 3D query object having its sample views. For example, input unit 120 may allow a user to enter the sample views of the 3D query object or select as a 3D query object one of the 3D candidate objects by reference to information stored in database 160, and retrieve the sample views of the selected 3D candidate object from database 160. In decision block 820, controller 130 checks to determine whether the query object descriptor of the 3D query object exists in database 160. If controller 130 determines that the query object descriptor of the 3D query object exists in database 160, then the process proceeds to block 840. Otherwise, the process proceeds to block 830, where object descriptor determining unit 220 determines a query object descriptor of the 3D query object. For such determination, object descriptor determining unit 220 may perform the object descriptor determination method illustrated above with reference to FIG. 4.

In block 840, object matching unit 240 may compare the query object descriptor of the 3D query object with candidate object descriptors of 3D candidate objects. For the comparison, object matching unit 240 may access database 160 to retrieve information (e.g., candidate object descriptors) on part or all of the 3D candidate objects. In performing the comparison, object matching unit 240 may calculate distances between the query object descriptor of the 3D query object and the candidate object descriptors of the 3D candidate objects. In response to the comparison, object matching unit 240 may select the 3D candidate object with a candidate object descriptor having the smallest distance from the query object descriptor of the 3D query object. Alternatively, object matching unit 240 may select the 3D candidate objects having distances less than a predetermined threshold distance from the query object descriptor of the 3D query object, and determine all such 3D candidate objects as a matched object(s).

In some embodiments, object matching unit 240 may perform a two stage search operation to find one or more matched objects. Object matching unit 240 may compare the query object descriptor of the 3D query object with class descriptors that respectively identify candidate classes, each of which may be linked to candidate object descriptors of at least one 3D candidate object. For the comparison, object matching unit 240 may first perform the first step search identifying a matched class. The matched class may be the most probable to include a candidate object descriptor of a 3D candidate object, providing the best match with the 3D query object. Then, object matching unit 240 may perform the second step search. In the second step search, the query object descriptor of the 3D query object is compared with the candidate object descriptors of the 3D candidate objects that belong to the matched class to ultimately identify at least one matched object that is similar to the 3D query object.

Figure 9:
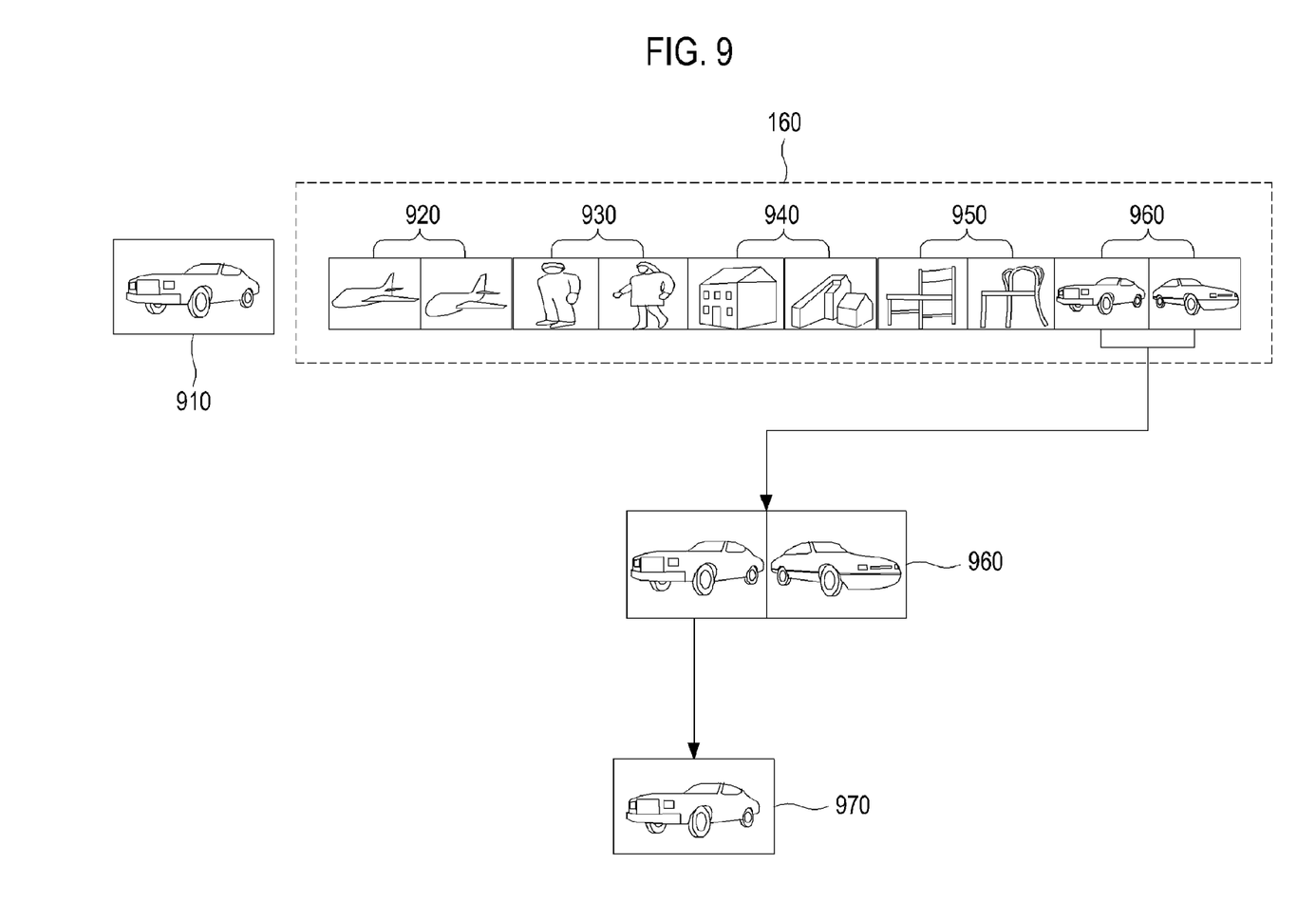
FIG. 9 shows a schematic diagram depicting an illustrative embodiment of a technique for performing a two-step search for retrieving a 3D candidate object in a database.

Referring to FIG. 9, a schematic diagram depicting an illustrative embodiment of a technique for performing a two-step search operation on 3D candidate objects is illustrated. In the illustrated embodiment, database 160 includes 5 classes, i.e., an airplane class 920, a human class 930, a house class 940, a chair class 950, and a car class 960. Moreover, each class is shown as having two 3D candidate objects. Object matching unit 240 may compare the query object descriptor of 3D query object 910 (e.g., a car) with the class descriptors of classes 920-960. Object matching unit 240 may measure distances between the query object descriptor of the 3D query object 910 and the class descriptors of classes 920-960, thereby producing similarities between the 3D query object 910 and classes 920-960. In the illustrated embodiment, the class descriptor of car class 960 may have the smallest distance from the query object descriptor of the 3D query object. Thus, car class 960 may be selected as a match class. Thereafter, object matching unit 240 may select as a matched object 3D candidate object 980, having a candidate object descriptor with the smallest distance from the query object descriptor of the 3D query object. Alternatively, object matching unit 240 may select 3D candidate objects 970 and/or 980 having distances less than a predetermined threshold distance from the query object descriptor of the 3D query object as a matched object(s).

Referring back to FIG. 8, in block 850, object matching unit 240 may retrieve object representative images of the matched object(s). The retrieved object representative images may be displayed on display 180 for the user's reference. Object matching unit 240 then completes.

In light of the present disclosure, those skilled in the art will appreciate that the systems, apparatus, and methods described herein may be implemented in hardware, software, firmware, middleware, or combinations thereof and utilized in systems, subsystems, components, or sub-components thereof. For example, a method implemented in software may include computer code to perform the operations of the method. This computer code may be stored in a machine-readable medium, such as a computer-readable or processor-readable medium or a computer program product, or transmitted as a computer data signal embodied in a carrier wave, or a signal modulated by a carrier, over a transmission medium or communication link. The machine-readable medium may include any medium capable of storing or transferring information in a form readable and executable by a machine (e.g., by a processor, a computer, etc.).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A 3D object computing apparatus comprising:
a microprocessor;
an input unit in communication with the microprocessor, configured to receive as input at least one sample view of a 3D query object to be inputted;
an object descriptor determining unit electrically coupled to the microprocessor and configured to generate at least one object representative image of the 3D query object from the at least one sample view and to determine a query object descriptor of the 3D query object from the at least one object representative image;
an object classifying unit electrically coupled to the microprocessor, the object classifying unit configured to:
retrieve candidate object descriptors of two or more 3D candidate objects each of the candidate object descriptors being associated with at least one object representative image;
compare the candidate object descriptors to obtain similarities therebetween;
classify the candidate object descriptors into at least one class based on the similarities;
use a clustering algorithm to generate at least one class representative image from the candidate object descriptors of the two or more 3D candidate objects;
determine at least one class descriptor, wherein determining the at least one class descriptor comprises determining at least one class image descriptor and concatenating the at least one class image descriptor; and
an object matching unit configured to:
compare the query object descriptor of the 3D query object with at least one class descriptor respectively identifying classes, each of the classes being associated with at least one candidate object descriptor of the 3D candidate objects, to find a matched class thereby;
compare the query object descriptor of the 3D query object with the at least one candidate object descriptor associated with the matched class to find a matched object thereby.

2. The apparatus of claim 1, further comprising a database that stores candidate object descriptors of 3D candidate objects and an object matching unit configured to compare the query object descriptor of the 3D query object with the candidate object descriptors of the 3D candidate objects to select at least one of the 3D candidate objects matched with the 3D query object as a matched object.

3. The apparatus of claim 2, wherein the database further stores object representative images of the 3D candidate objects, and the apparatus further including a class descriptor determining unit configured to generate at least one class representative image from the object representative images of the 3D candidate objects having candidate object descriptors classified into the at least one class to determine a class descriptor of the at least one class representative image of the at least one class.

4. The apparatus of claim 1, wherein the object descriptor determining unit is further configured to apply a clustering algorithm to the at least one sample view of the 3D query object to generate the at least one object representative image of the 3D query object.

5. The apparatus of claim 4, wherein the clustering algorithm includes an affinity propagation algorithm.

6. The apparatus of claim 1, wherein the object descriptor determining unit is further configured to determine an image descriptor for each of the at least one object representative image of the 3D query object and to determine the query object descriptor of the 3D query object based on the image descriptor.

7. The apparatus of claim 6, wherein the object descriptor determining unit is further configured to concatenate the image descriptor for each of the at least one object representative image of the 3D query object so as to determine the query object descriptor of the 3D query object.

8. A method performed under the control of an object retrieval apparatus, the method comprising:

receiving at least one sample view of a 3D query object;

using a clustering algorithm to generate at least one object representative image of the 3D query object based on the at least one sample view of the 3D query object;

determining an image descriptor for each of the at least one object representative image;

determining a query object descriptor of the 3D query object from the respective image descriptor for each of the at least one object representative image;

retrieving candidate object descriptors of two or more 3D candidate objects, each of the candidate object descriptors being associated with at least one object representative image;

comparing the candidate object descriptors to obtain similarities therebetween;

classifying the candidate object descriptors into at least one class based on the similarities;

using a clustering algorithm to generate at least one class representative image from the candidate object descriptors of the two or more 3D candidate objects;

determining at least one class descriptor, wherein determining the at least one class descriptor comprises determining at least one class image descriptor and concatenating the at least one class image descriptor;

comparing the query object descriptor of the 3D query object with at least one class descriptor respectively identifying classes, each of the classes being associated with at least one candidate object descriptor of the 3D candidate objects, to find a matched class thereby;

comparing the query object descriptor of the 3D query object with the at least one candidate object descriptor associated with the matched class to find a matched object thereby.

9. The method of claim 8 further comprising:

retrieving at least one object representative image of the matched object.

10. The method of claim 9, wherein comparing the candidate object descriptors includes:

measuring distance between the query object descriptor of the 3D query object and each of the candidate object descriptors of the 3D candidate objects.

11. The method of claim 10, wherein comparing the query object descriptor of the 3D query object further includes:

finding as the matched object, one of the 3D candidate objects having the candidate object descriptor with the shortest distance from the query object descriptor of the 3D query object.

12. A computer-readable storage medium whose contents cause a processor to:

receive at least one sample view of a 3D query object;

use a clustering algorithm to generate at least one object representative image of the 3D query object based on the at least one sample view of the 3D query object;

determine an image descriptor for each of the at least one object representative image;

determine a query object descriptor of the 3D query object from the respective image descriptor for each of the at least one object representative image;

determine a query object descriptor of the 3D query object from the candidate object descriptor for each of the at least one object representative image;

retrieve candidate object descriptors of at least one 3D candidate object, each of the candidate object descriptors being associated with at least one object representative image;

compare the candidate object descriptors to obtain similarities therebetween;

classify the candidate object descriptors into at least one class based on the similarities;

use a clustering algorithm to generate at least one class representative image from the candidate object descriptors of the two or more 3D candidate objects;

determine at least one class descriptor, wherein determining the at least one class descriptor comprises determining at least one class image descriptor and concatenating the at least one class image descriptor;

compare the query object descriptor of the 3D query object with at least one class descriptor respectively identifying classes, each of the classes being associated with at least one candidate object descriptor of the 3D candidate objects, to find a matched class thereby; and compare the query object descriptor of the 3D query object with the at least one candidate object descriptor associated with the matched class to find a matched object thereby.

13. The computer-readable storage medium of claim 12, wherein the mathematical algorithm includes an affinity propagation algorithm.

14. The computer-readable storage medium of claim 12 wherein comparing the candidate object descriptors comprises measuring the distance between the query object descriptor of the 3D query object and each of the candidate object descriptors of the 3D candidate objects.

15. The computer-readable storage medium of claim 12 wherein finding a matched class comprises finding as the matched class one of the class descriptors having the shortest distance from the query object descriptor.

16. The computer readable-storage medium of claim 12 wherein finding a matched object comprises finding as the matched object one of the candidate object descriptors having the shortest distance from the query object descriptor.

* * * * *

UNITED STATES PATENT AND TRADEMARK OFFICE
CERTIFICATE OF CORRECTION

PATENT NO. : 8,229,928 B2  
APPLICATION NO. : 12/395441  
DATED : July 24, 2012  
INVENTOR(S) : Yun Page 1 of 1

It is certified that error appears in the above-identified patent and that said Letters Patent is hereby corrected as shown below:

In the Specification

In Column 7, Line 53, delete "thererto." and insert -- thereto. --, therefor.

In the Claims

In Column 10, Line 31, in Claim 1, delete "objects" and insert -- objects, --, therefor.

In Column 12, Line 62, in Claim 16, delete "computer readable-storage" and insert -- computer-readable storage --, therefor.

Signed and Sealed this  
Eleventh Day of June, 2013

Teresa Stanek Rea  
*Acting Director of the United States Patent and Trademark Office*